(12) United States Patent
Yoon et al.

(10) Patent No.: US 8,275,088 B2
(45) Date of Patent: Sep. 25, 2012

(54) PERFORATED PLATE SUPPORT FOR DUAL-COOLED SEGMENTED FUEL ROD

(75) Inventors: Kyung-Ho Yoon, Daejeon (KR); Hyung-Kyu Kim, Daejeon (KR); Jae-Yong Kim, Daejeon (KR); Young-Ho Lee, Daejeon (KR); Kang-Hee Lee, Daejeon (KR); Tae-Hyun Chun, Daejeon (KR); Wang-Kee In, Daejeon (KR); Dong-Seok Oh, Daejeon (KR); Chang Hwan Shin, Gyeongsangnam-do (KR); Kun-Woo Song, Daejeon (KR)

(73) Assignees: Korea Atomic Energy Research institute, Seoul (KR); Korea Hydro and Nuclear Power Co., Ltd., Seoul (KR)

( * ) Notice: Subject to any disclaimer, the term of this patent is extended or adjusted under 35 U.S.C. 154(b) by 467 days.

(21) Appl. No.: 12/421,829

(22) Filed: Apr. 10, 2009

(65) Prior Publication Data
US 2010/0172460 A1 Jul. 8, 2010

(30) Foreign Application Priority Data
Jan. 7, 2009 (KR) .................. 10-2009-0001116

(51) Int. Cl.
*G21C 3/34* (2006.01)

(52) U.S. Cl. ........................... 376/438; 376/455
(58) Field of Classification Search .............. 376/438, 376/455
See application file for complete search history.

(56) References Cited

U.S. PATENT DOCUMENTS

| | | | |
|---|---|---|---|
| 4,900,507 A * | 2/1990 | Shallenberger et al. | 376/352 |
| 6,909,765 B2 * | 6/2005 | Lahoda | 376/260 |
| 2007/0258556 A1 * | 11/2007 | Song et al. | 376/455 |
| 2008/0232537 A1 | 9/2008 | Reparaz et al. | |
| 2009/0052607 A1 | 2/2009 | Lee et al. | |

* cited by examiner

*Primary Examiner* — Ricardo Palabrica
(74) *Attorney, Agent, or Firm* — Fredrikson & Byron, P.A.

(57) ABSTRACT

A perforated plate support supports dual-cooled fuel rods, each of which has concentric outer and inner tubes and is coupled with upper and lower end plugs at upper and lower ends thereof, and guide thimbles, each of which is used as a passage for a control rod. The perforated plate support is formed as a support plate having the shape of a flat plate, which includes internal channel holes, each of which has a diameter corresponding to an outer diameter of the inner tube, guide thimble holes, each of which has a diameter corresponding to an outer diameter of the guide thimble, and sub-channel holes around each internal channel hole. The upper or lower end of the dual-cooled fuel rod is coupled to the support plate such that the outer diameter of the inner tube is matched with the diameter of the internal channel hole.

15 Claims, 6 Drawing Sheets

PERFORATED PLATE SUPPORT FOR DUAL-COOLED SEGMENTED FUEL ROD

CROSS REFERENCE TO RELATED APPLICATION(S)

This application claims the benefit of Korean Patent Application No. 2009-0001116, filed on Jan. 7, 2009, entitled "PERFORATED PLATE SUPPORT FOR DUAL-COOLED SEGMENTED FUEL ROD," which is hereby incorporated by reference in its entirety into this application.

BACKGROUND OF THE INVENTION

1. Field of the Invention

The present invention relates, in general, to a support for a dual-cooled segmented fuel rod and, more particularly, to a perforated plate support for a dual-cooled segmented fuel rod, capable of stably supporting the fuel rod to the end of its cycle even if an gap between the fuel rods becomes narrow due to application of a dual-cooled fuel rod, and of reducing vibration induced by flows of the inside and outside of the dual-cooled fuel rod for obtaining high burnup and power.

2. Description of the Related Art

A nuclear fuel assembly is charged in the core of a pressurized water reactor. This nuclear fuel assembly is composed of a plurality of fuel rods, in each of which a cylindrical uranium sintered compact (or a cylindrical uranium pellet) is inserted.

The fuel rods can be divided into two types, cylindrical and annular, according to shape. The annular fuel rods are called dual-cooled fuel rods.

In comparison with the pellet of the cylindrical fuel rod, the pellet of the annular fuel rod has a low internal temperature due to a thinner thickness and a wider heat transfer area, and thus a relatively higher safety margin.

Figure 1:
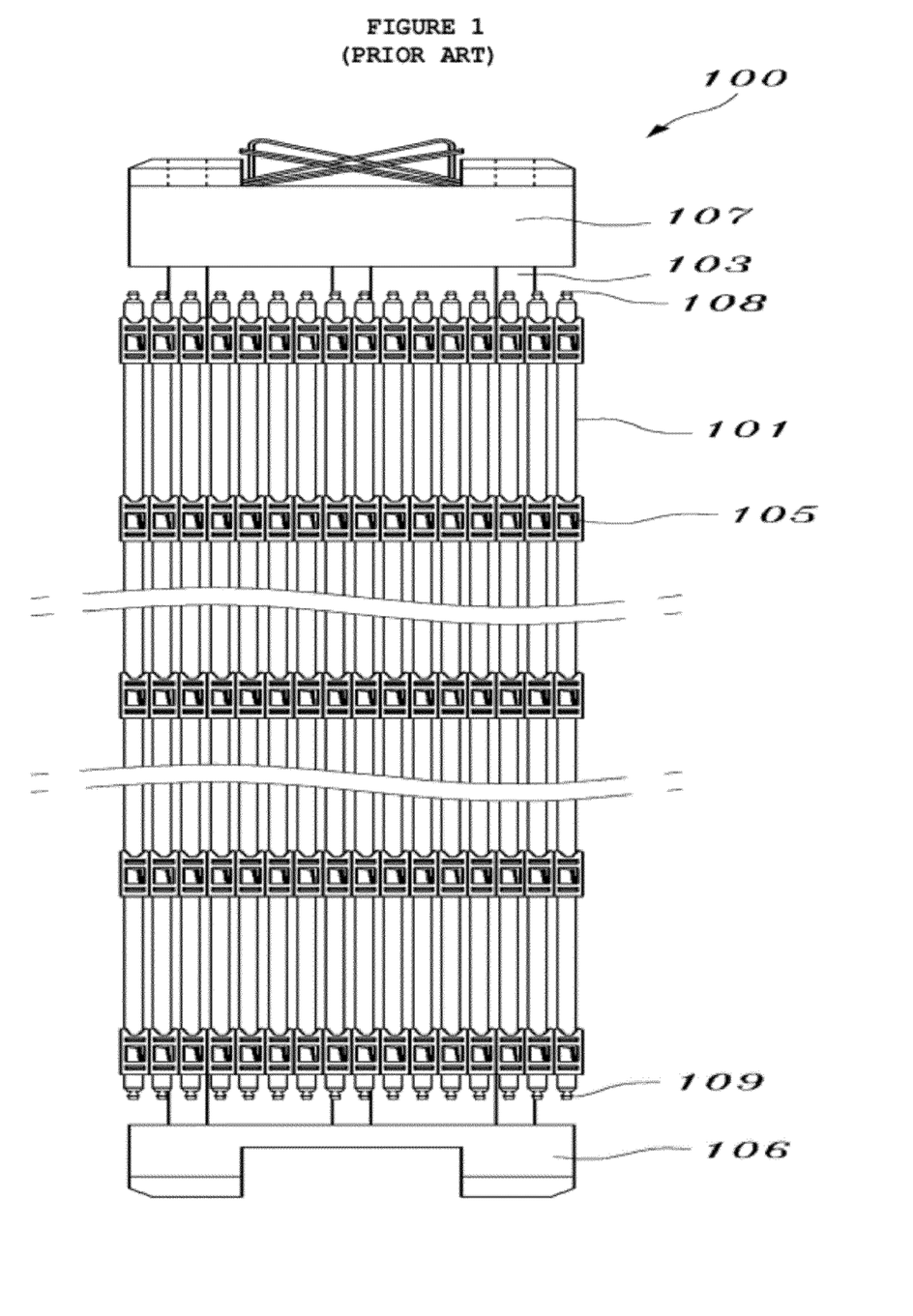
FIG. 1 is a schematic front view illustrating a conventional nuclear fuel assembly having cylindrical fuel rods.

FIG. 1 is a schematic front view illustrating a conventional cylindrical nuclear fuel assembly. Referring to FIG. 1, the nuclear fuel assembly 100 includes fuel rods 101, spacer grids 105, guide thimbles 103, an upper end fitting 107 and a lower end fitting 106.

Each fuel rod 101 has a structure in which a uranium sintered compact or a uranium pellet (not shown) generating high-temperature heat through nuclear fission is enclosed by a zirconium alloy cladding tube.

Each fuel rod 101 has upper and lower end plugs 108 and 109 coupled to lower and upper portions thereof so as to prevent inert gas filled between the cladding tubes thereof from leaking out.

Meanwhile, the structure of the fuel rod 101 has a length considerably long compared to the diameter thereof When this structure having a great slenderness ratio is subjected to coolant flow, the fuel rod 101 causes flow-induced vibrations due to the flow of the coolant. Thus, in order to reduce these flow-induced vibrations, the structure called a spacer grid 105 is installed in a predetermined section with respect to the entire length of the fuel rods 101 so as to support the fuel rods 101, thereby preventing the fuel rods 101 from being vibrated by the flow of the coolant.

However, in the case of the dual-cooled fuel rod designed to charge nuclear fuel into an annular space defined by a dual tube of inner and outer tubes, the spacer grid taking charge of an important function of inhibiting the vibration of the fuel rods caused by the flow of the coolant has no choice but to support only the outer tube of each fuel rod due to its structure. Due to the limitation of this supporting structure, in the case of the inner tube having the slenderness ratio of about 400 or more, only opposite ends of each fuel rod are supported by the upper and lower end plugs.

Of course, in the case of the dual-cooled fuel rod, a uranium dioxide ($UO_2$) pellet exists between the inner and outer tubes. Thus, the vibration of the inner tube is expected to be inhibited to a certain extent. However, in cases of a fuel rod having an slenderness ratio of about 400 or more, it is easily surmised that a vibration amplitude of the inner tube is remarkably great, as compared to the outer tube having numerous support points formed in an axial direction of the fuel rod by the spacer grid.

The flow of the coolant in the internal coolant channel defined by the inner tube of the dual-cooled fuel rod can be interpreted as a problem of vibration of the tube in which fluid flows. Thus, if the vibration of this inner tube is not properly controlled, it is difficult to avoid damage to the fuel rod due to such vibration.

Figure 2:
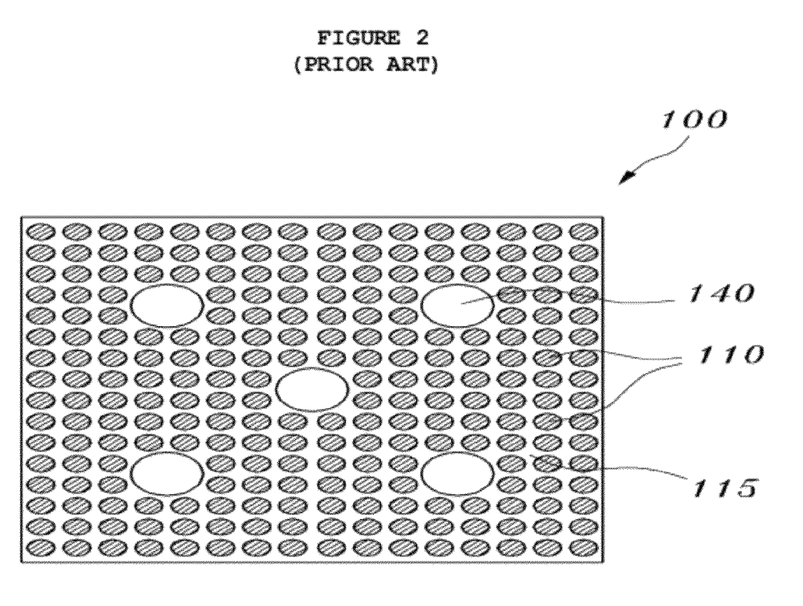
FIG. 2 is a schematic cross-sectional view illustrating the nuclear fuel assembly of FIG. 1.
Figure 3:
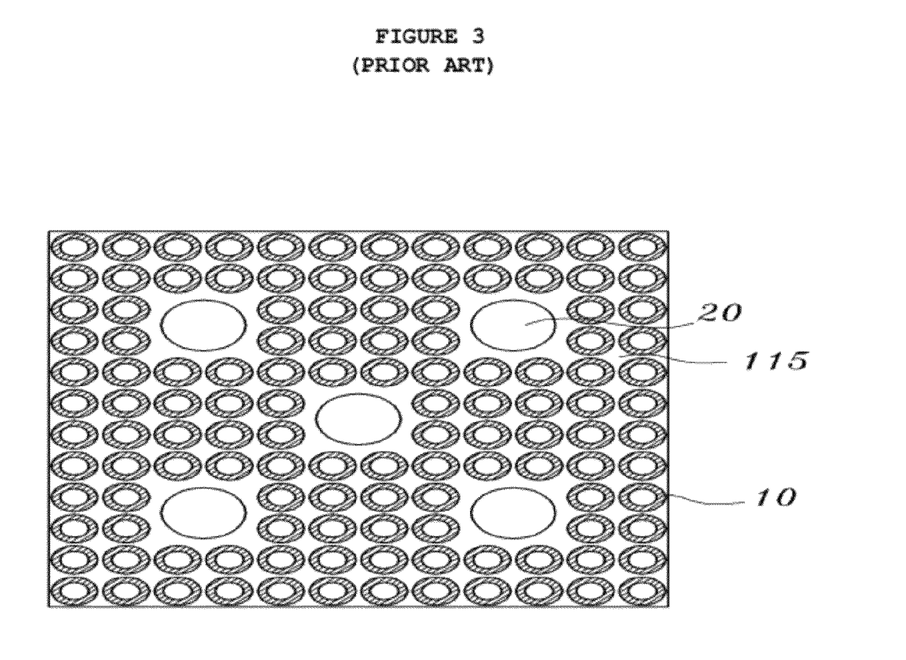
FIG. 3 is a schematic cross-sectional view illustrating a nuclear fuel assembly having dual-cooled fuel rods.

Further, there are additional considerations to consider in the case of the application of the dual-cooled fuel rod 10. In order to be structurally compatible with the core of the existing pressurized water reactor illustrated in FIG. 2, structural limitations that cannot change positions of core structural components, for instance guide thimbles 140, in the nuclear fuel assembly 100 must be accepted, and the outer diameter of the fuel rod yet must still be increased. As such, an gap between the dual-cooled fuel rod and the spacer grid has no alternative but to be considerably narrowed compared to an existing gap. For example, as in FIG. 3, if the nuclear fuel assembly is configured so that the positions of the guide thimbles 140 are maintained without change according to a design of the nuclear fuel assembly forming a 12×12 array, the gap between the dual-cooled fuel rod 10 and the unit spacer grid is reduced from 1.45 mm, which is the existing gap, to about 0.39 mm. Thus, due to the narrow gap between the dual-cooled fuel rod 10 and the unit spacer grid, technology that forms a fuel rod supporting structure on a surface of the unit spacer grid in order to support the fuel rod has until now been difficult to apply to the dual-cooled fuel rod.

SUMMARY OF THE INVENTION

Accordingly, the present invention has been made keeping in mind the above problems, namely, that it is difficult for a support structure, such as a conventional spacer grid formed of a thin plate having grid springs and dimples, to support the dual-cooled fuel rod, and thus embodiments of the present invention provide a perforated plate support, in which a thin plate is provided with numerous holes, and each end plug of the dual-cooled fuel rod is coupled to the thin plate around each hole by, for instance, welding, thereby effectively supporting the fuel rod although an gap between the fuel rods is narrow.

Further, there is provided a perforated plate support capable of coupling two of at least two dual-cooled fuel rods into which a dual-cooled fuel rod having a great slenderness ratio is segmented.

According to an exemplary embodiment of the present invention, there is provided a perforated plate support, which supports dual-cooled fuel rods, each of which has concentric outer and inner tubes and is coupled with upper and lower end plugs at upper and lower ends thereof, and guide thimbles, each of which is used as a passage for a control rod, and which is formed as a support plate having the shape of a flat plate, which includes internal channel holes, each of which has a diameter corresponding to an outer diameter of the inner tube, guide thimble holes, each of which has a diameter corresponding to an outer diameter of the guide thimble, and sub-channel holes around each internal channel hole. The upper or lower end of the dual-cooled fuel rod is coupled to the support plate such that the outer diameter of the inner tube is matched with the diameter of the internal channel hole.

The dual-cooled fuel rod may be segmented into at least two dual-cooled fuel rods. Further, the first of the dual-cooled segmented fuel rods may be located on the support plate and be coupled to the internal channel hole at a lower end thereof, whereas the second dual-cooled segmented fuel rod may be located under the support plate and be coupled to the internal channel hole at an upper end thereof.

The upper or lower end of the dual-cooled fuel rod may be welded to the support plate.

The internal channel holes may be arranged in such a manner that lines extending from centers of the neighboring ones of the internal channel holes form square grids, and the sub-channel holes may be disposed in centers of the square grids, respectively. At this time, each sub-channel hole may have a diameter identical to the outer diameter of the outer tube.

The internal channel holes may form a 12×12 array.

The support plate may overlap with another support plate so as to form two layers coupled up and down.

The support plate may include steps around each internal channel hole. Each step may have arcuate contact faces so as to correspond to the outer diameter of the outer tube. The outer tube may come into close contact with the steps and be welded to the steps.

At this time, the inner tube may protrude outwardly from the upper or lower end of the dual-cooled fuel rod, and the protruding inner tube may be inserted into the internal channel hole.

The support plate may be coupled with an outer plate along an outer circumference thereof which has guide taps and flow mixture vanes alternately formed.

At this time, the outer plate may be coupled to the support plate so as to protrude from one of upper and lower surfaces of the support plate. The support plate may include two support plates, from one surface of which the outer plate does not protrude, and which are coupled to each other.

According to embodiments of the present invention, the perforated plate support can properly support the fuel rods even if an gap between the fuel rods is reduced to about 1.0 mm or less because a nuclear fuel assembly is constituted of dual-cooled fuel rods, each of which has a dual tube structure of inner and outer tubes and is subjected to an increase in outer diameter. This perforated plate support has the shape capable of supporting the fuel rods despite the narrow gap between the fuel rods, and makes it possible to support the inner tube, each of which has difficulty in forming a support section except an upper or lower end plug, at regular gaps, unlike the outer tube supported outside at regular gaps, so that the fuel rod is inhibited from excessively being vibrated by a coolant flowing through an internal channel of the fuel rod, and a possibility of fretting wear occurring due to either friction between the fuel rod and the support section or impact load is remarkably reduced. As a result, it is possible to prevent operational efficiency of a nuclear power plant from being reduced by damage to the fuel rod.

Further, the fuel rod is supported in a transverse direction rather than in an axial direction as in the prior art, so that, although impact load against the fuel rod occurs in the transverse direction, i.e. on the side, of the fuel rod, excessive plastic deformation is inhibited. Thus, a nuclear fuel assembly, impact strength of which is promoted, can be obtained.

This means that, even in the case in which the design peak ground acceleration in the seismic design codes based on earthquakes and accidents involving the loss of coolant is boosted to 0.3 G, more excellent structural soundness can be ensured by securing sufficient impact strength. In detail, in the case of the convention spacer grid, thin plates are arranged in a lengthwise direction of the fuel rod, and then are welded to each other. As such, there is a high possibility of, when the impact load is applied on the side, excessive plastic deformation occurring to limit a path along which a control rod is inserted. However, in the case of the perforated plate support, the plate is disposed in a transverse direction rather than in a lengthwise direction of the fuel rod. Thus, when the impact load is applied on the side, the perforated plate support makes a rigid motion along with the fuel rod. As such, the impact strength is considerably increased compared to the conventional spacer grid. Thus, although the design peak ground acceleration against the seismic load is boosted, more excellent structural soundness can be obtained.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Reference will now be made in greater detail to an exemplary embodiment of the invention with reference to the accompanying drawings.

Figure 4:
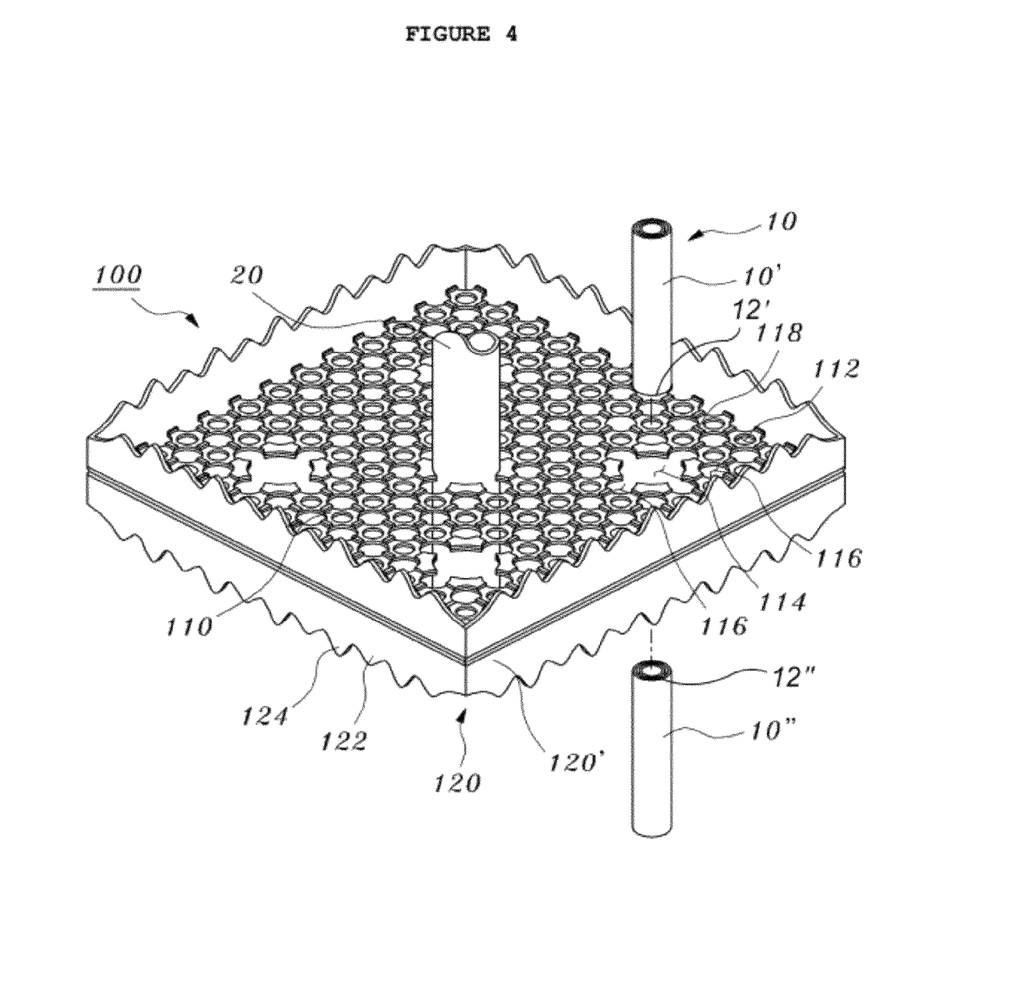
FIG. 4 is a schematic perspective view illustrating a perforated plate support and a dual-cooled fuel rod and a guide thimble coupled to the perforated plate support in accordance with an embodiment of the present invention.
Figure 5:
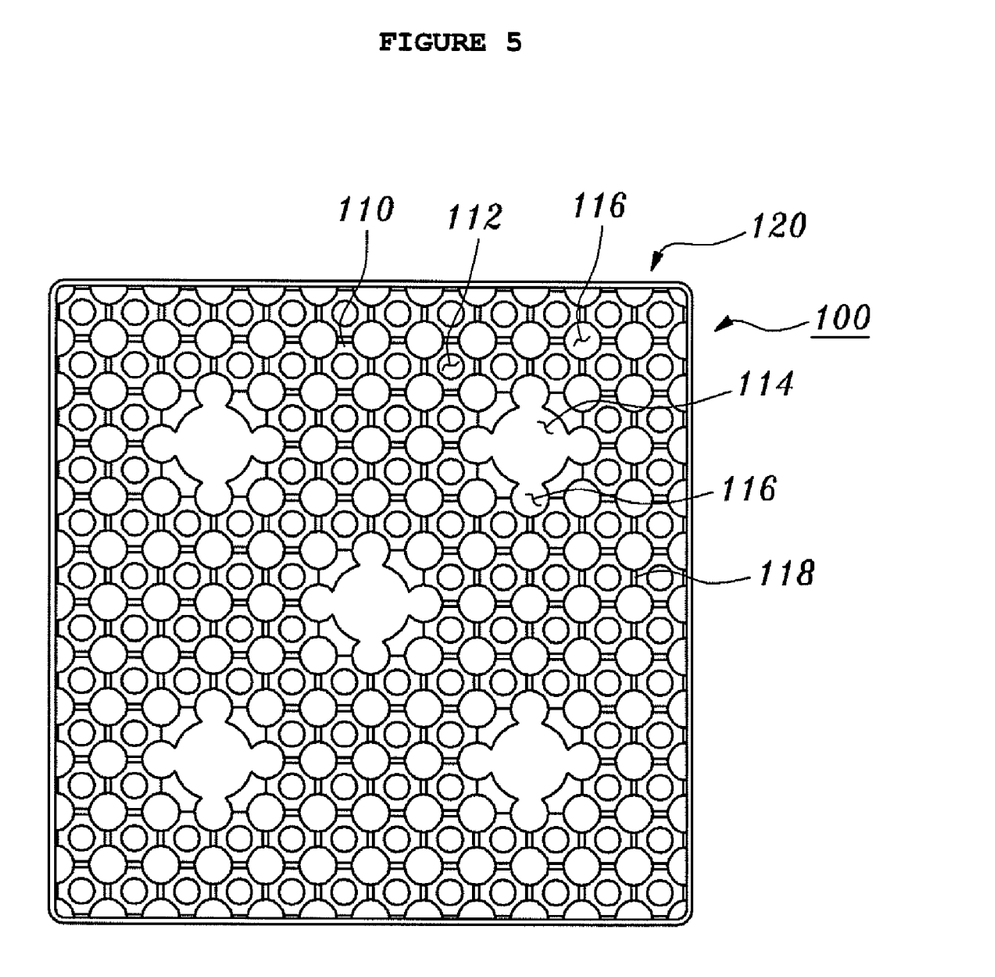
FIG. 5 is a top plan view illustrating a perforated plate support according to an embodiment of the present invention.

According to an embodiment of the present invention, the detailed configuration of a perforated plate support 100 is well shown in FIGS. 4 and 5.

The perforated plate support 100 is used to support dual-cooled fuel rods 10, each of which has concentric outer and inner tubes 12 and 14 and is coupled with upper and lower end plugs 16 and 18 at upper and lower ends thereof, and guide thimbles 20, each of which is used as a passage for a control rod (not shown). Particularly, the perforated plate support 100 is formed as a support plate 110 having the shape of a flat plate, which includes a plurality of internal channel holes 112 having a diameter corresponding to an outer diameter of the inner tube 14, and a plurality of guide thimble holes 114 having a diameter corresponding to an outer diameter of the guide thimble 20. The support plate 110 includes sub-channel holes 116 around each internal channel hole 112. The upper or lower end of the dual-cooled fuel rod 10 is coupled to the support plate 110 such that the outer diameter of the inner tube 14 is matched with the diameter of the internal channel hole 112.

Here, the internal channel hole 112 is for a coolant flowing in the inner tube 14 of the dual-cooled fuel rod 10, whereas the sub-channel hole 116 is for a coolant flowing out of the outer tube 12 of the dual-cooled fuel rod 10. Thus, the support plate 110 has two channels for dually cooling the inside and outside of the dual-cooled fuel rod 10.

The dual-cooled fuel rod 10 may be configured as a single fuel rod. However, the dual-cooled fuel rod 10 is preferably configured as at least two segmented fuel rods, because support soundness of the dual-cooled fuel rod 10, particularly the inner tube 14, is promoted.

If the dual-cooled fuel rod 10 is configured of a single fuel rod, the perforated plate support 100 can be coupled only to two places, i.e. the upper and lower ends, of the dual-cooled fuel rod. In contrast if the dual-cooled fuel rod 10 is segmented into two or more dual-cooled fuel rods, the first dual-cooled segmented fuel rod 10' located on the support plate 110 is coupled to the internal channel hole 112 at a lower end thereof and the second dual-cooled segmented fuel rod 10" located under the support plate 110 is coupled to the internal channel hole 112 at an upper end thereof As such, the number of points supporting the inner tube 14 is increased. The fact itself that the number of points supporting the inner tube 14 is increased can be sufficiently anticipated improving the support soundness of the dual-cooled fuel rod 10. Furthermore, since the slenderness ratio of the dual-cooled fuel rod 10 is reduced in inverse proportion to the number of segmented fuel rods, rigidity against the flow-induced vibration is greatly increased as well.

When the support plate no is welded to the upper or lower end 12" or 12', respectively, of this dual-cooled fuel rod 10 (including the dual-cooled segmented fuel rods 10" and 10', respectively), this makes it possible to secure more sufficient coupling strength.

Meanwhile, the internal channel holes 112 are arranged in such a manner that lines extending from the centers of the neighboring ones of the internal channel holes 112 form square grids. This arrangement can be regarded as the configuration of a typical nuclear fuel assembly. In this embodiment, the internal channel holes 112 are arranged so as to conform with a 12×12 array. Of course, the guide thimble 20, which is used as the passage for the control rod and is supported in the guide thimble hole 114, is coupled with an end fitting at a lower end thereof so that there is no flow of the coolant.

At this time, as illustrated in FIG. 4, the sub-channel hole 116 is formed in the center of the square grid. With this configuration, four of the sub-channel holes 116 enclose one of the internal channel holes 112 in a square shape. Here, the diameter of the sub-channel 116 can be identical to the outer diameter of the outer tube 12.

Further, the sub-channel holes 116 are provided around the guide thimble hole 114. Since the outer diameter of the guide thimble 20 is typically larger than that of the dual-cooled fuel rod 10, the sub-channel holes 116 provided around the guide thimble hole 114 partially overlap with the guide thimble hole 114 when each sub-channel 116 has the same diameter as the outer tube 12 as illustrated in FIGS. 4 and 5.

Further, the support plate 110 may be formed in such a manner that two support plates having the same geometry overlap with each other so as to be coupled up and down. In this case, the rigidity of the support plate 110 is further increased.

The support plate 110 is provided with steps 118 around each internal channel hole 112, wherein each step 118 has arcuate contact faces so as to correspond to the outer diameter of the outer tube 12. The arcuate contact faces of each step 118 come into close contact with an outer circumference of the dual-cooled fuel rod 10, particularly an outer circumference of the outer tube 12 of the dual-cooled fuel rod 10, so as to generate sufficient frictional force, thereby improving fixability of the dual-cooled fuel rod 10. Due to the configuration of this step 118, it is possible to eliminate welding when the dual-cooled fuel rod 10 is fixed to the support plate 110. Further, when the steps 118 are formed so as to be exactly symmetrical about the internal channel hole 112, the center of the inner tube 14 of the dual-cooled fuel rod 10 is accurately aligned with that of the internal channel hole 112. Of course, in spite of the configuration of this step 118, the outer tube 12 may come into close contact with the steps 118, and then be welded to the steps 118 for the purpose of firmer coupling.

Figure 6:
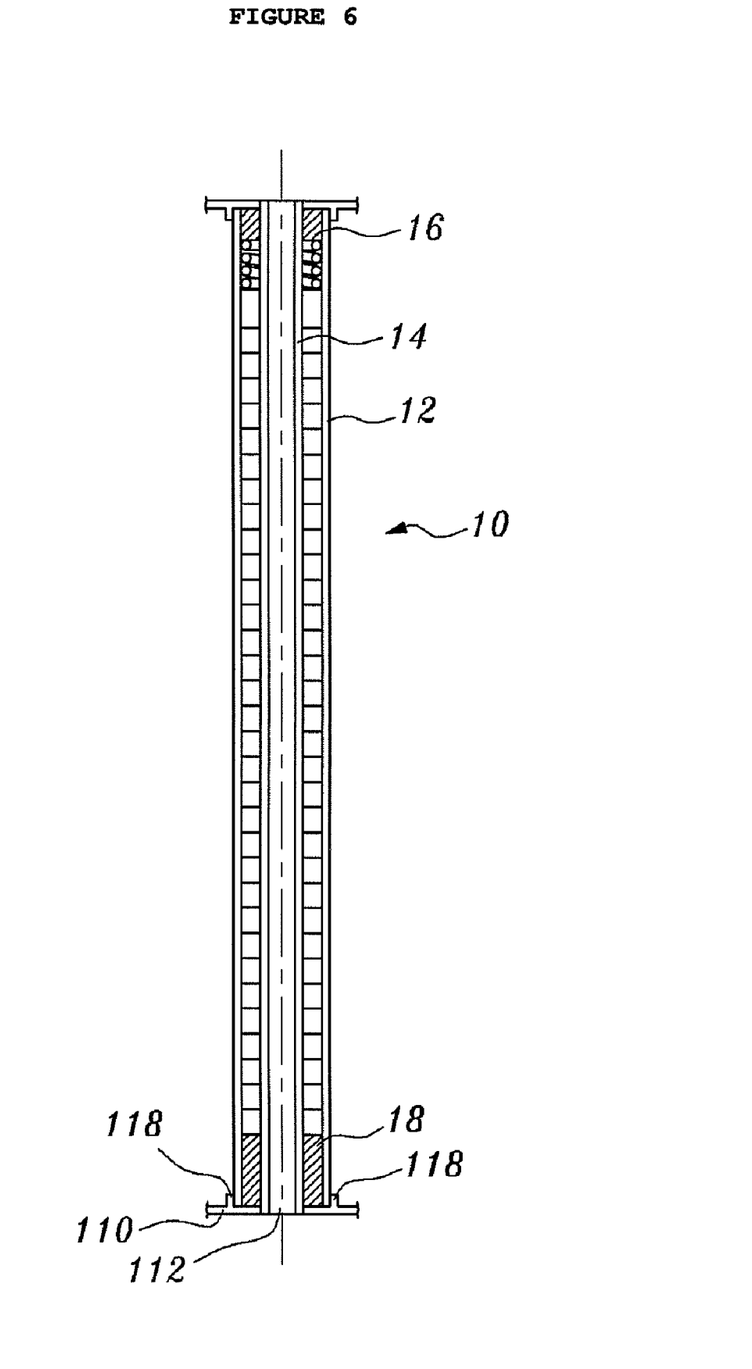
FIG. 6 is a sectional view illustrating a coupled state of a dual-cooled segmented fuel rod and a perforated plate support according to an embodiment of the present invention.

The inner tube 14 may protrude outwardly from the upper or lower end of the dual-cooled fuel rod 10, and then the protruding inner tube 14 may be inserted into the internal channel hole 112. Due to this configuration, the dual-cooled fuel rod 10 can be more accurately aligned with the internal channel hole 112, and coupling strength between the inner tube 14 and the support plate 110 can be improved. The coupled state between the inner tube 14 and the internal channel hole 112 is shown in FIG. 6. If the configuration of the abovementioned step 118 is added to this configuration, the alignment and the coupling strength can be further improved upon.

Further, the support plate 110 may be coupled with an outer plate 120 along an outer circumference thereof The outer plate 120 has guide taps 122 for smoothly charging and discharging the nuclear fuel and flow mixture vanes 124 for promoting mixture of the coolant, wherein the guide taps 122 alternate with the flow mixture vanes 124. This outer plate 120 is manufactured by preparing numerous unit outer plates 120', each of which has the shape of a flat plate in which the guide taps 122 alternate with the flow mixture vanes 124, welding four of the unit outer plates 120' to the outer circumference of the support plate 110, and welding ends of the unit outer plates 120' contacted with each other at the corners of the support plate 110.

At this time, the outer plate 120 may be coupled to one of the upper and lower surfaces of the support plate 110, and then two support plates, from one surface of which this outer plate 120 does not protrude, may be coupled into one support plate 110. Two surfaces of the two support plates which do not face each other, i.e. which are exposed to the outside, are provided with the abovementioned steps 118. Further, the outer plates 120 contacted when these two support plates are coupled can be welded.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:
1. A nuclear fuel assembly comprising:
a perforated plate support, which supports dual-cooled fuel rods, each of which has concentric outer and inner tubes and is coupled with upper and lower end plugs at upper and lower ends thereof, and guide thimbles, each of which is used as a passage for a control rod,
wherein the perforated plate support is formed as a support plate having the shape of a flat plate, which includes internal channel holes, each of which has a diameter corresponding to an outer diameter of the inner tube, guide thimble holes, each of which has a diameter cor- responding to an outer diameter of the guide thimble, and sub-channel holes around each internal channel hole, wherein the upper or lower end of the dual-cooled fuel rod is coupled to the support plate such that the outer diameter of the inner tube is matched with the diameter of the internal channel hole, and wherein the internal channel holes are arranged in such a manner that lines extending from centers of the neighboring ones of the internal channel holes form square grids, and the sub-channel holes are disposed in centers of the square grids, respectively.

2. The nuclear fuel assembly as set forth in claim 1, wherein the dual-cooled fuel rod is segmented into at least two dual-cooled fuel rods.

3. The nuclear fuel assembly as set forth in claim 2, wherein the first of the dual-cooled segmented fuel rods is located on the support plate and is coupled to the internal channel hole at a lower end thereof, and the second dual-cooled segmented fuel rod is located under the support plate and is coupled to the internal channel hole at an upper end thereof.

4. The nuclear fuel assembly as set forth in one of claims 1 through 3, wherein the upper or lower end of the dual-cooled fuel rod is coupled to the support plate.

5. The nuclear fuel assembly as set forth in claim 1, wherein each sub-channel hole has a diameter identical to the outer diameter of the outer tube.

6. The nuclear fuel assembly as set forth in claim 1, wherein the internal channel holes form a 12×12 array.

7. The nuclear fuel assembly as set forth in claim 1, wherein the support plate overlaps with another support plate so as to form two layers coupled up and down.

8. The nuclear fuel assembly as set forth in claim 1 or 7, wherein the support plate includes steps around each internal channel hole, each step having arcuate contact faces so as to correspond to the outer diameter of the outer tube.

9. The nuclear fuel assembly as set forth in claim 8, wherein the outer tube comes into contact with the steps and is welded to the steps.

10. The nuclear fuel assembly as set forth in claim 1 or 7, wherein the inner tube protrudes outwardly from the upper or lower end of the dual-cooled fuel rod, and the protruding inner tube is inserted into the internal channel hole.

11. The nuclear fuel assembly as set forth in claim 10, wherein the support plate includes steps around each internal channel hole, each step having arcuate contact faces so as to correspond to the outer diameter of the outer tube.

12. The nuclear fuel assembly as set forth in claim 11, wherein the outer tube comes into contact with the steps and is coupled to the steps.

13. The nuclear fuel assembly as set forth in claim 1, wherein the support plate is coupled with an outer plate along an outer circumference thereof which has guide taps and flow mixture vanes alternately formed.

14. The nuclear fuel assembly as set forth in claim 13, wherein the outer plate is coupled to the support plate so as to protrude from one of upper and lower surfaces of the support plate.

15. The nuclear fuel assembly as set forth in claim 14, wherein the two support plates are coupled to each other, and the surfaces of the two support plates which do not face each other are provided with the outer plates.

* * * * *